United States Patent [19]

Ruble et al.

[11] 3,753,254

[45] Aug. 14, 1973

[54] THERMAL EXPANSION COMPENSATION FOR DISC DRIVE MEMORY

[75] Inventors: Frank D. Ruble; Terence H. West; Frank J. Sordello, all of San Jose, Calif.

[73] Assignee: Information Storage Systems, Inc., Cupertino, Calif.

[22] Filed: Aug. 19, 1971

[21] Appl. No.: 173,033

[52] U.S. Cl. .......................................... 340/174.1 B

[51] Int. Cl. .............................................. G11b 5/56

[58] Field of Search ............... 340/174.1 B, 174.1 C

[56] References Cited

UNITED STATES PATENTS

| | | | |
|---|---|---|---|
| 3,531,789 | 9/1970 | Halfhill et al. | 340/174.1 B |
| 3,270,328 | 8/1966 | McCreary | 340/174.1 B |
| 3,191,179 | 6/1965 | Pelech et al. | 340/174.1 E |

*Primary Examiner*—Vincent P. Canney
*Attorney*—C. Michael Zimmerman

[57] ABSTRACT

Apparatus for a disc drive memory is described for continuously compensating for the effects of thermal expansion on the positioning of read/write heads with respect to a disc pack. The apparatus includes a thermister which is positioned to register temperature changes occurring in air which has passed in heat conducting relationship over a disc surface, as well as a thermistor for measuring a temperature representative of the average temperature of the support structure extending between the read/write heads and the disc pack. Changes in temperature detected by the thermistors are compared with one another and to a set reference temperature in order to generate a compensation signal for super-imposition on the positioning signal which regulates the head position controller so that a correction is made for the effect of thermal expansion on the positioning of the heads.

10 Claims, 2 Drawing Figures

INVENTORS
FRANK D. RUBLE
TERENCE H. WEST
FRANK J. SORDELLO
BY
S. Michael Zimmerman
ATTORNEY

THERMAL EXPANSION COMPENSATION FOR DISC DRIVE MEMORY

BACKGROUND OF THE INVENTION

The present invention relates to random access memory drive and recording mechanisms, and, more particularly, to apparatus for compensating for the effects of thermal expansion on the positioning of a data transfer device such as a read/write head with respect to a data storage device such as a magnetically recordable disc pack.

As the speed of computers and other data processing units has increased, there has been a strong demand that the speed with which data or information is transferable between data memories and a computer be correspondingly increased. For this reason, direct access memories of the type employing a pack of rotating magnetic discs for recording and storing data are being widely adopted. Memories of this nature have the advantage of enabling information to be either transferred to, or removed from, randomly selected locations or tracks on the disc without the necessity of the memory having to serially "seek" the desired location such as must, for example, magnetic tape memories.

To be effective, a random access disc pack memory apparatus of this type must be capable of quickly and precisely positioning read/write heads with respect to the recording discs of the disc pack at specified radial address locations. For this reason, relatively sophisticated position sensing and positioning systems, such as those disclosed in commonly owned and copending application Ser. Nos. 63,508 (now abandoned) and 172,781 filed respectively Aug. 13, 1970 and Aug. 18, 1972 and entitled "Position Sensor" and "Linear Positioning Apparatus for Memory Disc Pack Drive Mechanisms," respectively, have been developed. Such systems rely on the use of sensors of one sort or another to generate one or more electrical position signals representative of the position at any given time of the read/write heads with respect to the recording discs during relative motion of the two. Such signals are then used to produce a control signal suitable for introduction into a position controller to position the heads at the desired locations with respect to the discs.

It will be recognized that for precise positioning, the effects of thermal expansion of those parts of the device supporting the read/write heads with respect to the disc packs must also be taken into account. The problem of thermal expansion is particularly acute during the warm-up period of the memory device and when a disc pack at an ambient room temperature is placed within a drive and recording apparatus already at its operating temperature. It has been sufficient with past positioning accuracy requirements to provide temperature compensation only after the disc pack has been changed. An example of such a temperature compensation system is that described and claimed in U. S. Pat. No. 3,531,789 issued Sep. 29, 1970 to M. O. Halfhill et al., for "Temperature Compensation for Data Storage Device."

There has not only been a demand that the access speed of data memory devices be increased, but also a strong demand that the capacity thereof, i.e., the amount of data or information which can be stored in a given size area, be correspondingly increased. With respect to disc pack types of memories, a preferred method by which this can be accomplished is by increasing the number of tracks on each disc surface at which data can be stored on the surface. Any such increase in the track density requires, though, that the system for positioning the read/write heads with respect to any particular track be correspondingly more precise to provide the necessary discrimination between adjacent tracks. The effects of differential thermal expansion due to changing ambient conditions and other causes on such positioning during steady-state operation of the device will prevent achieving the precise positioning that is necessary. Thus, in order to appreciably increase the storage capacity by the preferred method, one must be capable of compensating for thermal expansion not only during machine and/or disc pack warm-up, but also during steady-state operation of the machine.

There are several factors which have inhibited development in the past of a practical and yet effective means for compensating for thermal expansion. For one thing, there are many different materials in the apparatus supporting the read/write heads with respect to the disc packs, many of which have different thermal coefficients of expansion. Any compensation system taking each of such materials into direct consideration would be unduly complex and too expensive for use. Another problem is that the movements required of the read/write heads and the disc pack have prevented accurate temperature determinations of each. For example, disc packs are normally rotated at speeds between 40 and 60 revolutions per second. Because of such fast rotary motion, and because one must have the capability of easily removing and replacing disc packs, it is not practical to install a temperature transducer directly in the disc pack. Remote temperature sensing devices such as radiation detectors are presently too costly to warrant their usage except as a last resort.

SUMMARY OF THE INVENTION

The present invention provides apparatus which is capable of compensating for the effects of thermal expansion on the positioning of a data transfer device with respect to a data storage device during all phases of operation of the memory of which such devices are a part, including during steady-state operation thereof. As one particularly salient feature of the instant invention, it has been found that in order to provide the desired temperature compensation, it is not necessary to measure the temperature of the data storage device, e.g., a disc pack, directly. More particularly, it has been found that by monitoring the temperature of air or another gaseous medium which has passed over a recording or other major surface of a storage device, one can obtain a sufficiently accurate indication of temperature changes in the storage device itself for use in a continuous temperature compensation system. It has also been found that it is not necessary to measure the temperature or otherwise determine the expansion of each of the many materials making up the apparatus providing support between the data storage and transfer devices. Rather, accurate compensation can be made by measuring changes in a temperature which is representative of the average temperature of all of the supporting apparatus materials, if such temperature changes are compared in a particular manner with both a reference temperature and the temperature changes occurring in either the data storage device or the data transfer device.

As another salient aspect of the instant invention, it includes means for compensating for differential expansion which occurs in data storage devices themselves. That is, it has been found that some data storage devices expand differentially across the storage surface or surfaces thereof. For example, the discs of a disc pack expand by different amounts radially along their recording surfaces. The invention provides compensation for this differential expansion by making the compensation signal dependent upon the location of the desired position for the data transfer device with respect to such storage device at any given time.

The invention includes other features and advantages which will become apparent from the following more detailed description of preferred embodiments thereof.

BRIEF DESCRIPTION OF THE DRAWING

With reference to the accompanying sheet of drawing.

DETAILED DESCRIPTION OF THE PREFERRED EMBODIMENTS

Figure 1:
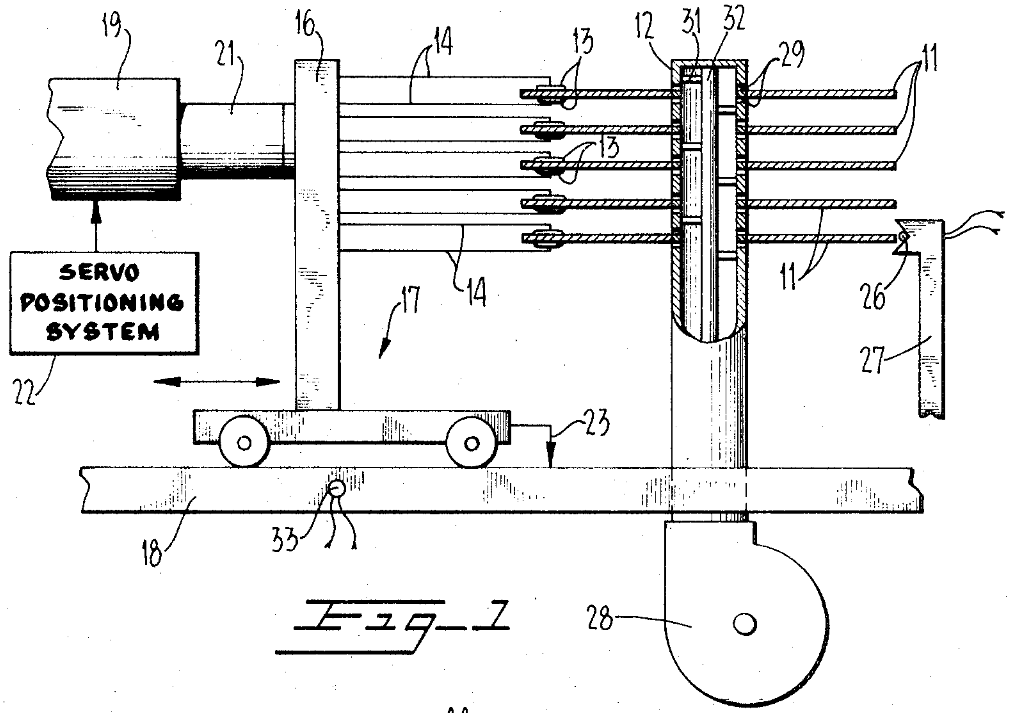
FIG. 1 is a schematic and partially broken away side elevational view of the main functional components of a memory disc drive and recording apparatus, including aspects of the instant invention.

With reference first to FIG. 1, the major components of a disc pack drive and recording mechanism are illustrated. More particularly, a data storage device in the form of a disc pack which is made up of a plurality of coaxial discs 11 is axially mounted for rotation on a drive spindle 12. The planer surfaces of each of the discs 11 are coated with a magnetically recordable material to provide the desired data storage surfaces.

Associated with each recording surface of a disc is a data transfer device in the form of a read/write head 13. The heads 13 are supported via cantilevered support arms 14 from an upright 16 of a carriage mechanism 17. As is schematically indicated, the carriage mechanism 17 is mounted on a base plate 18 for translation with respect thereto to position the head 13 at different radial positions along the recording surfaces of discs 11. A position controller, specifically depicted as an electromagnetic actuator 19 having a moving coil 21, is secured to upright member 16 to selectively translate the carriage 17 and thereby provide the desired radial positioning of the heads 13 with respect to the disc surfaces. A servo positioning system 22 such as that described and claimed in commonly owned copending application Ser. No. 792,343 entitled "Apparatus for Maintaining a Servo Controller Member in a Selected Position" — Brunner et al., filed on Jan. 21, 1969 and issued on Aug. 3, 1971 as U.S. Pat. No. 3,597,750, is provided to generate the appropriate control signal for regulating the position controller. A position sensing mechanism, represented in the figure by pointer 23, provides the relative positioning information required by the servo system to properly regulate operation of the position controller. Such sensing system is desirably one of those described in commonly owned copending applications Ser. Nos. 63,508 (now abandoned) and 172,781 respectively identified as "Position Sensor" — Martin et al., filed Aug. 13, 1970 and "Linear Positioning Apparatus for Memory Disc Pack Drive Mehcanisms" — Sordello et al., filed Aug. 18, 1971.

As mentioned previously, one of the factors which has inhibited development of an accurate system for compensating for the effect of thermal expansion on head positioning is that there has been no practical means of obtaining an accurate indication of changes in the temperature of the disc pack. The fact that the pack must rotate at a relatively high speed and be easily removable from the system has prevented a simple and yet accurate measurement of its temperature.

It has been found that it is not necessary to actually monitor the temperature of the disc pack in order to accurately sense changes in its temperature. More particularly, the invention includes as a particularly salient feature thereof a temperature transducer 26 which is suitably mounted, such as by a stand 27, at a location at which it will intercept air flow which is passed over the recording surface of one of the discs in heat conducting relationship thereto. It has been found that as the temperature of a recording disc changes, it causes a corresponding change in the temperature of the air flowing thereover. In this connection, it should be noted that most disc drive arrangements include means for assuring good air flow over the disc surfaces. The purpose of such air flow is not only to assure that the environment of the disc surfaces is maintained clean, but also to provide the air needed to aerodynamically support the heads 13 with respect to their associated surfaces. In the particular embodiment illustrated, the air flow is provided via an air pump 28 which forces air into the hollow central portion of spindle 12. Such spindle includes openings 29 adjacent the disc surfaces through which the air can flow for passage over the surfaces. The flow out openings 29 is aided by the vanes 31 which also act as radial support members for securing the tubular portion of spindle 12 to a central support rod 32.

Changes in the temperature of the air flowing over the surface of a disc provides a direct representation of the temperature changes in the disc, integrated radially over its surface. The measurement of such air temperature change for one of the discs 11 provides a sufficiently precise indication of the change of temperature over the full disc pack for use in an accurate air temperature compensation system.

Another factor which has inhibited the development of accurate temperature compensation systems is that there are many different parts and components which are affected by temperature change and which are relied upon in providing the desired positioning of the heads 13 at a preselected location with respect to the disc surfaces 11. That is, changes in temperature will cause thermal expansion in various ones of the supporting structures, such as the spindle 12, base plate 18, carriage 17, position controller 19, and cantilevered arms 14. Since these various structures providing the supporting link between the discs and the heads are generally made of different materials and have quite different mechanical and geometrical configurations, it will be appreciated that the total effect of the same on the desired positioning is quite complex. Each provides a variable affecting the positioning and must be taken into account before precise positioning can be either obtained or maintained.

As another important feature of the instant invention, it includes means for taking all of the support structure into account without the necessity of monitoring the temperature of each of its components. More particularly, it has been found sufficient to detect changes in a temperature which is representative of the average temperature of the full supporting apparatus. To this end, temperature transducer 33 is mounted in base plate 18 in order to detect temperature changes in the same. As is illustrated, the base plate is a relatively major part of the supporting structure linking the recording discs 11 to the heads 13. Thus, although its temperature may not actually be the average temperature of the supporting structure, its temperature will be representative thereof. Moreover, because the base plate is fairly massive and therefore has a fairly high heat capacity, short duration temperature fluctuations which do not appreciably affect the overall thermal expansion of the supporting apparatus will not be registered.

It has been found empirically and analytically that the required distance through which a read/write head must be shifted to compensate for thermal expansion is generally defined by either of the following equations:

$$\text{Compensation distance} = \pm A\,\Delta T_1 \pm B\,\Delta T_2 \pm C\cdot D\,\Delta T_2$$
$$\text{or } A\,\Delta T_1 \pm B\,\Delta T_2 \pm E\cdot D\,\Delta T_1$$

where $A$ = empirically determined constant relating the $\Delta T_1$ temperature change to a distance change;

- $\Delta T_1$ = difference in temperature between the average temperature of the supporting structure and either the air flow over the disc pack or one of the read/write heads;
- $B$ = empirically determined constant relating the $\Delta T_2$ temperature change to a distance change;
- $\Delta T_2$ = difference in temperature between a set reference temperature and one of the temperature values used in computing $\Delta T_1$
- $C$ and E = empirically determined constants reflecting the thermal expansion of a recording surface of the disc pack and relating temperature change to a distance change; and
- $D$ = variable whose value is dependent on the track address of a desired head position.

The signs in the above equations will be determined by the $\Delta T$ factors. That is, the signs will be determined by which of the temperature values used in computing the particular $\Delta T$ factor is greater than the other.

It will be seen from the above equations that compensation can be provided by first determining the difference in temperature between the air which has passed over the disc pack and the base plate, and the temperature difference between the base plate and a set reference temperature, and then combining the differences. The equations also include a term for taking into account the effect on the positioning caused by differential thermal expansion across a recording disc. That is, they include a term whose value is dependent upon the location on the disc surface of the desired head position or track.

Figure 2:
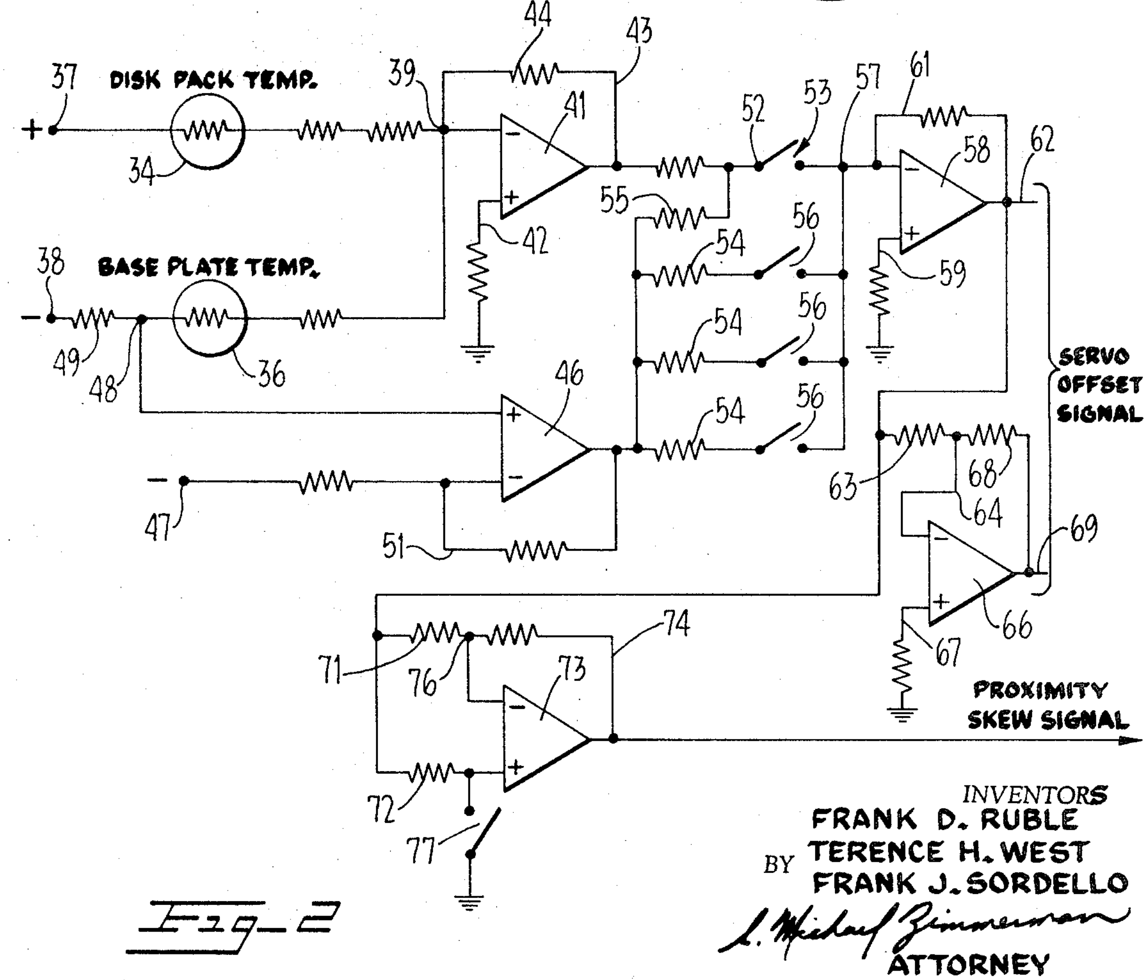
FIG. 2 is a schematic electrical diagram of a preferred embodiment of a thermal expansion compensation system incorporating the invention.

FIG. 2 illustrates a preferred electrical temperature compensation system utilizing the output of the transducers 26 and 33 in solving the above equations. More particularly, both of the temperature transducers 26 and 33 are thermistors which are respectively referred to in FIG. 2 by the reference numerals 34 and 36. The electrical arrangement of FIG. 2 includes means for generating an electrical signal which has a potential level proportional to the difference between the temperature reported by thermistor 36, i.e., the temperature representative of the average temperature of the supporting apparatus, and the temperature reported by thermistor 34, i.e., the temperature representative of the temperature of the disc pack. To this end, the thermistors 34 and 36 are connected in parallel with one another between constant, opposite voltage levels represented at 37 and 38, respectively, and the negative input terminal 39 of an inverting amplifier 41. As is illustrated, the positive input terminal 42 of such amplifier is grounded. The result is that the input terminal 39 is maintained at a virtual ground potential by generating the required output voltage to do so from the amplifier through feedback loop 43.

The potentials at terminals 37 and 38, as well as the values of the resistances provided by the thermistors and the other resistances in series therewith, are chosen to provide a virtual ground potential at amplifier terminal 39 with a zero or predetermined reference output voltage from amplifier 41 when the resistances of the thermistors relative to one another indicate that there is no temperature differential between the disc pack and the base plate temperature. If the resistance provided by one of the thermistors 34 and 36 should change relative to the other, i.e., indicate a temperature differential between the components associated with each, the balance between the legs containing the thermistors will be shifted one way or the other, with the result that an output potential proportional to the shift will be generated by the difference amplifier 41 in order to maintain the terminal 39 at virtual ground. For example, if the temperature of the air flowing over the disc pack should rise relative to the base plate temperature, the resistance of thermistor 34 will be correspondingly lowered. This will tend to make the junction 39 at the negative input terminal positive by a corresponding potential. As a result, the output of amplifier 41 will be made to become negative in order to offset the positive potential provided at terminal 39 and maintain the same at virtual ground. It will thus be seen that the output of inverting amplifier 41 will be a potential which is proportional to any net temperature differential recorded by the thermistors 34 and 36.

Means are also provided for generating an electrical signal having a potential level which is proportional to the difference between a set reference temperature and the base plate temperature. More particularly, a second inverting amplifier 46 is provided with a constant negative reference potential applied at 47 to its negative input terminal. Such reference potential represents the net reference temperature. The other input terminal of amplifier 46 is connected at a location 48 at which it will be subjected to the potential drop between the virtual ground terminal 39 and the potential provided by the drop across resistor 49. This potential level at 48 is chosen to provide a potential at the positive terminal of the amplifier which is equal to the potential provided at the second terminal when the average temperature of the supporting structure, as indicated by the resistance of theristor 36, is at a predetermined value with respect to the reference temperature. It will be seen that under such conditions, the output of amplifier 46 will be zero when the average temperature is at such predetermined value, but will be caused by the feedback loop 51 to become a positive or negative value proportional to any change in the resistance of thermistor 36 indicating a deviation of the base plate temperature from the predetermined value.

As is illustrated, the combined outputs of the amplifiers 41 and 46 are applied to one terminal 52 of an "Active Compensation" switch 53. The switch 53 is operated by a signal from the servo position system to be closed only when the heads 13 are in the vicinity of a desired position. Thus, the compensation voltages generated by the apparatus of the invention will not affect the servo positioning system when it is in the process of moving the heads between two different tracks, since temperature compensation is neither necessary nor desirable at such time.

As mentioned previously, the discs 11 react to thermal changes by expanding differentially radially thereof. That is, it has been found that the discs' incremental rate of expansion is a function of the radial position for a given incremental temperature change. The result is that a different amount of compensation is required for different positioning of the head radiallY of such discs. The invention also includes, as an important part thereof, means for providing such differential compensation. Most simply, such means is in the form of a plurality of resistors 54, each of which is connected in parallel with the switch 53 and its associated resistor 55, and each of which has a switch 56 connected therewith. It will be appreciated that upon the closing of various ones and combinations of the switches 56, the resistance to which the output voltage of amplifier 46 is subjected can be varied. Thus, appropriate signals from the servo positioning system indicative of the radial location or "track address" of the desired positioning of the heads 13 can be used to selectively close the switches 56 to provide an appropriate amount of resistance to change the potential level at terminal 57 to reflect the radial location of the desired head position. In this connection, it should be noted that the number of parallel resistors 54 provided for connection in parallel with switch 52 and its associated resistance 55 is dependent upon the accuracy of the positioning required relative to the amount of differential expansion which occurs radially of the discs 11. That is, for greater accuracy, a greater number of resistors can be provided to increase the number of available resistance combinations which can be used, thereby increasing the number of areas into which the disc surface area can be divided.

Means responsive to the voltage applied at terminal 57 by developing the required temperature compensation signal for superimposition on the servo positioning signal to provide the desired compensation is also provided. More particularly, the potential at terminal 57 is applied to the negative input terminal of an inverting operational amplifier 58. As is shown, the positive input terminal of such amplifier is grounded at 59. The feedback loop 61 will thus cause the amplifier 58 to develop an output voltage at 62 which is proportional to the potential generated at terminal 57 by the combined signals from the inverting amplifiers 41 and 46 aS modified by the switches in parallel resistances 56.

The output of amplifier 58 is also fed through a resistor 63 to the negative input terminal 64 of another inverting amplifier 66. The positive input terminal of such amplifier is grounded at 67. The resistance 68 in the inverting amplifier feedback loop is equal to the resistor 63, with the consequence that the potential drop across resistance 63, i.e., the potential output of amplifier 58, will cause an equal and opposite potential to be developed at the output terminal 69 of amplifier 66.

The equal and opposite voltages developed at terminals 62 and 69 provide the desired temperature compensation signal for superimposition on the signal of the servo positioning system. The compensation signal is combined with the positioning control signal, such as via the summing junction shown and described with respect to FIG. 6 of the previously mentioned copending patent application Ser. No. 172,781, entitled "Linear Positioning Apparatus for Memory Disc Pack Drive Mechanisms," to offset the servo positioning of the heads 13 to provide the desired compensation for thermal expansion.

Many servo positioning systems for disc drive positioning and recording apparatuses include a "proximity" signal means which prevents the transfer of data between its heads and its recording surfaces unless the heads are within a certain vicinity range of the desired location with respect to the recording tracks. Thus, if for some reason the heads should be improperly positioned or unintentionally moved from their position, the proximity signal will prevent data from being either read from, or written into, the wrong track on the discs. Such proximity signals are generally derived from the head position indicating signals before the latter are combined or otherwise manipulated to provide the control signal which actually directs the electro magnetic actuator. Thus, in such instances the temperature compensation offset signal from the terminals 62 and 69 corrects the positioning of the heads but without causing a corresponding correction in the proximity range. The invention therefore includes means responsive to the temperature compensation signal by shifting the proximity range to correspond with the corrected positioning of the heads. More particularly, the output from inverting amplifier 58 is applied respectively through resistances 71 and 72 to the negative and positive input terminals of another operational amplifier 73. The feedback loop 74 of such amplifier causes the output of the same to be locked to the potential at terminal 62, thus forming a non-inverting, unity gain amplifier. Such output will therefore be equal to the offset signal at terminal 62 of amplifier 58 and provides a "skew" signal for shifting the proximity range by an amount proportional to the offseting of the position control signal by the temperature compensation signal.

In some servo positioning arrangements, the signal states of the control signal indicative of adjacent cylinder positions for the heads are 180° out of spatial phase with respect to one another. This is true of the positioning signal provided in the previously mentioned copending application Ser. No. 172,781, for example. With such an arrangement, means should be provided for reversing the polarity of the output voltage of amplifier 73 for each alternate position so that the direction in which the proximity range is shifted will be proper irrespective of the slope of the positioning signal at the particular states representative of the adjacent positions. Such polarity reversal is accomplished in a simple manner in the instant invention by including a switch 77 for alternately grounding the positive terminal of the amplifier 73 to turn the same into an inverting amplifier. Thus, the output which must be generated by the amplifier 73 to maintain the input terminals with no voltage differential therebetween will swing between positive and negative values of a potential equal in magnitude to the potential received thereby from output terminal 62 of amplifier 58, depending on the state of switch 77.

While the invention has been described in connection with a preferred embodiment thereof, it will be appreciated by those skilled in the art that various changes and modifications can be made without departing from its spirit. Therefore, it is intended that the coverage afforded applicant be limited only by the terms of the claims and their equivalents.

We claim:

1. Apparatus for compensating for the effects of thermal expansion on the positioning of a data transfer device with respect to a data storage device comprising means for generating a first electrical sinal having a potential level proportional to the difference between the average temperature of apparatus for supporting said data transfer device at a preselected position with respect to said data storage device and the temperature of one of said data transfer and data storage devices, means for generating a second electrical signal having a potential level proportional to the difference between a set reference temperature and either said average temperature or said temperature of said data transfer and storage devices, and means for combining said electrical signals to provide a temperature compensation signal for regulating a position controller for said data transfer device to compensate for any differences between the location of said preselected position and the positioning by said controller of said data transfer device which would occur if said compensation signal had not been provided.

2. The apparatus of claim 1 for compensating for the effects of thermal expansion on the positioning of a data transfer device with respect to a data storage device wherein said effects are a function of the location of said preselected position, and means are included for changing the potential level of said temperature compensation signal to reflect said location of the preselected position with respect to said data storage device.

3. The apparatus of claim 1 for compensating for the effects of thermal expansion on the positioning of a data transfer device with respect to a data storage device wherein said means for generating a first electrical signal generates such a signal having a potential proportional to the difference between said average temperature of the apparatus for supporting said data transfer device and the temperature of said data transfer device, and said means for generating said second electrical signal generates such a signal having a potential level proportional to the difference between said set reference temperature and said average temperature of said supporting apparatus.

4. The apparatus of claim 3 for compensating for the effects of thermal expansion on the positioning of a data transfer device with respect to a data storage device wherein said means for generating said first electrical signal includes means for detecting changes in the temperature of the data storage device, means for detecting changes in the average temperature of said supporting apparatus, and means responsive to a net relative change in the temperature differential between said data storage device and said average temperature of said supporting apparatus by generating said first electrical signal.

5. The apparatus of claim 4 for compensating for the effects of thermal expansion on the positioning of a data transfer device with respect to a data storage device wherein said means for detecting changes in the temperature of said data storage device includes a temperature transducer mounted to intercept gaseous flow which has passed in heat conducting relationship to said storage device during operation of said apparatus to detect changes in the temperature of said gas caused by said storage device and thereby provide a representation of changes in temperature of said device.

6. The apparatus of claim 4 for compensating for the effects of thermal expansion on the positioning of a data transfer device with respect to a data storage device wherein each of said means for detecting changes in the temperature of the data storage device and changes in the average temperature of said supporting apparatus is a thermistor, and said thermistors are connected in parallel between one input terminal of an inverting amplifier and positive and negative potential sources chosen to provide a virtual ground potential level at said one amplifier terminal upon said thermistors having resistances relative to one another representing no temperature differential between said data storage device and said average temperature of said supporting apparatus, the other input terminal of said inverting amplifier being connected to ground whereby any variation in the resistance provided by either one of said thermistors with respect to the other will result in a corresponding potential being produced at the output of said amplifier to provide said first signal.

7. The apparatus of claim 6 for compensating for the effects of thermal expansion on the positioning of a data transfer device with respect to a data storage device wherein said means for generating said second electrical signal includes an inverting amplifier having a constant reference potential representative of said reference temperature applied to one input terminal thereof, and a potential applied to the other input terminal through the one of said thermistors which detects changes in the temperature of said supporting apparatus, said reference potential applied to said first input terminal being chosen to provide a potenial at said terminal which is equal to the potential at said second terminal when said average temperature is at a predetermined value with respect to said reference temperature, whereby the output potential of said inverting amplifier will be proportional to the difference between said reference level potential and said other potential caused by changes in the resistance of said thermistor representative of a deviation of said average temperature from said reference temperature.

8. The apparatus of claim 4 for compensating for the effects of thermal expansion on the positioning of a data transfer device with respect to a data storage device wherein said effects are a function of the location of said preselected position, and means are included for changing the potential level of said temperature compensation signal to reflect said location of the preselected position with respect to said data storage device.

9. The apparatus of claim 4 wherein said position controller for said data transfer device includes means responsive to the receipt by said position controller of a positioning control signal which would result in said controller positioning said data transfer device out of a predetermined proximity range about said preselected location by preventing data transfer between said transfer device and said storage device, and said apparatus includes means responsive to said temperature compensation signal by shifting said proximity range to correspond with the corrected positioning of said transfer device with respect to said storage device caused by said temperature compensation signal.

10. In a random access memory apparatus of the type employing a disc pack for data storage and read/write heads for transferring data between the disc pack and a processing unit, means for detecting changes in the temperature of said disc pack comprising a temperature transducer mounted to intercept air flow which has passed in heat conducting relationship over one of the storage surfaces of said disc pack during operation thereof to detect changes in the temperature of said air caused by said storage surface and thereby provide a representation of changes in the temperature of said disc pack, means for generating a first electrical signal having a potential level proportional to the difference between the average temperature of apparatus for supporting said read/write heads at the preselected position with respect to said disc pack, and the temperature of said disc pack means for generating a second electrical signal having a potential level proportional to the difference between a set reference temperature and either said average temperature or said temperature of said air flow passing over one of the storage surfaces of said disc pack, and means for combining said electrical signals to provide a temperature compensation signal for regulating a position controller for said read/write heads to compensate for any differences between the location of said preselected position and positioning by said controller of said read/write heads which would occur if said compensation signal had not been provided.

* * * * *